(12) United States Patent
Burdett et al.

(10) Patent No.: US 6,327,675 B1
(45) Date of Patent: Dec. 4, 2001

(54) FAULT TOLERANT SYSTEM AND METHOD

(75) Inventors: Gregory P. Burdett, Georgetown; Michel Paquet, Aylmer; Rene Imbeau, Nepean, all of (CA); John O'Neill, Foxrock (IE); Mark Stubberfield, Basildon (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/126,855

(22) Filed: Jul. 31, 1998

(51) Int. Cl.$^7$ .................................................. G06F 11/00
(52) U.S. Cl. ................................................ 714/11; 714/4
(58) Field of Search ..................... 714/4, 10, 11, 714/13, 23

(56) References Cited

U.S. PATENT DOCUMENTS

| | | | | |
|---|---|---|---|---|
| 4,276,451 | * | 6/1981 | Beebe ........................................ | 379/15 |
| 4,881,227 | * | 11/1989 | Buhren ...................................... | 714/11 |
| 5,291,494 | | 3/1994 | Bruckert et al. ........................ | 371/11.3 |
| 5,367,665 | * | 11/1994 | Koch ......................................... | 714/11 |
| 6,145,089 | * | 11/2000 | Le ............................................. | 714/4 |
| 6,161,193 | * | 12/2000 | Garg ......................................... | 714/6 |

* cited by examiner

*Primary Examiner*—Dieu-Minh Le
*Assistant Examiner*—Bryce P. Bonzo
(74) *Attorney, Agent, or Firm*—Allan P. Millard (57) ABSTRACT

A fault tolerant modular computing or communications system is disclosed. The system comprises a plurality of primary processing modules and at least one spare module. These modules are preferably interconnected with a data network to switch and process network traffic. A control processing module controls overall operation of primary and spare modules. Upon failure of a primary processing module the control module senses the failure and determines if it is a recoverable fault, by preferably resetting the failed module. If fault is not recoverable, as manifested by an unsuccessful reset in a first sparing interval, data at the failed module is switched to a spare module. If the fault is recoverable and the reset is successful, data is not switched. If a subsequent failure of that module occurs in a second stability interval, data is immediately switched to the spare module. The system is particularly well suited for distinguishing software faults from non-recoverable hardware faults.

15 Claims, 11 Drawing Sheets

FAULT TOLERANT SYSTEM AND METHOD

FIELD OF THE INVENTION

The present invention relates to fault tolerant systems, and more particularly to modular computing and communications systems having at least one redundant module.

BACKGROUND OF THE INVENTION

Fault tolerant computing and communications systems having redundant or spare components are known. One or more active primary data processing components are shadowed by one or more spare components, ready to take the place of the primary components in the event of failure.

Typically, the systems are adapted to effect a switch-over from a failed active component to a spare component in real time, and as quickly as possible to avoid possible data losses at the failed component.

Such fault tolerant systems, however, are premised largely on the assumption that failures of components are caused by hardware failures which are typically permanent. In many systems, computing resources are distributed among modules, with each module having its own processor under software control. Such systems are prone to software faults within the modules, as well as traditional hardware faults. Software faults, unlike hardware faults, are often aberrant, occurring rarely under special circumstances. Moreover, software faults are typically not remedied by replacing one active module with an identical spare module having the same software deficiency.

Accordingly, a fault tolerant system that more effectively recognizes and handles recoverable faults is desirable.

SUMMARY OF THE INVENTION

In accordance with an aspect of the present invention, there is provided, in a modular computing system comprising at least one primary module processing data under software control, and one spare module capable of processing data under software control, a method of switching data at the primary module to the spare module, comprising the steps of: a) sensing failure of the primary module; b) resetting the primary module in response to sensing the failure; c) waiting a determined time interval for successful reset of the primary module; d) if reset in step b. is not successful in the determined time interval, switching the data from the primary module to the spare module, and processing the data at the spare module.

In accordance with another aspect of the present invention, there is provided, in a modular computing system, comprising at least one primary module for processing data, and one redundant module capable of processing data, a method of switching data from the primary module to the redundant module, comprising the steps of: a) sensing failure of the primary module; b) determining if the failure is recoverable; c) if the failure is not recoverable, switching the data from the primary module to the redundant module, and processing the data at the spare module.

In accordance with a further aspect of the present invention, there is provided a modular computing system comprising: a) at least one primary processing module, operable to process data at the primary processing module; b) a spare processing module, capable of processing data at the spare module c) a control processor interconnected with the spare processing module and the primary processing module to switch data between the primary module and the spare module; the control processor operable to i) sense failure of the primary module; ii) determine if the failure is recoverable; iii) if the failure is not recoverable, switch the data from the primary module to the spare module for processing of the data at the spare module.

In accordance with yet a further aspect of the present invention, there is provided a modular computing system comprising: a) at least one primary processing module, operable to process data at the primary processing module; b) a spare processing module, capable of processing data at the spare module; c) means for sensing failure of the primary module; d) means for determining if the failure is recoverable; and e) means for switching the data from the primary module to the spare module for processing of the data at the spare module, in the event of the failure is not recoverable.

BRIEF DESCRIPTION OF THE DRAWING

In figures which illustrate, by way of example, embodiments of the present invention.

DETAILED DESCRIPTION

Figure 1:
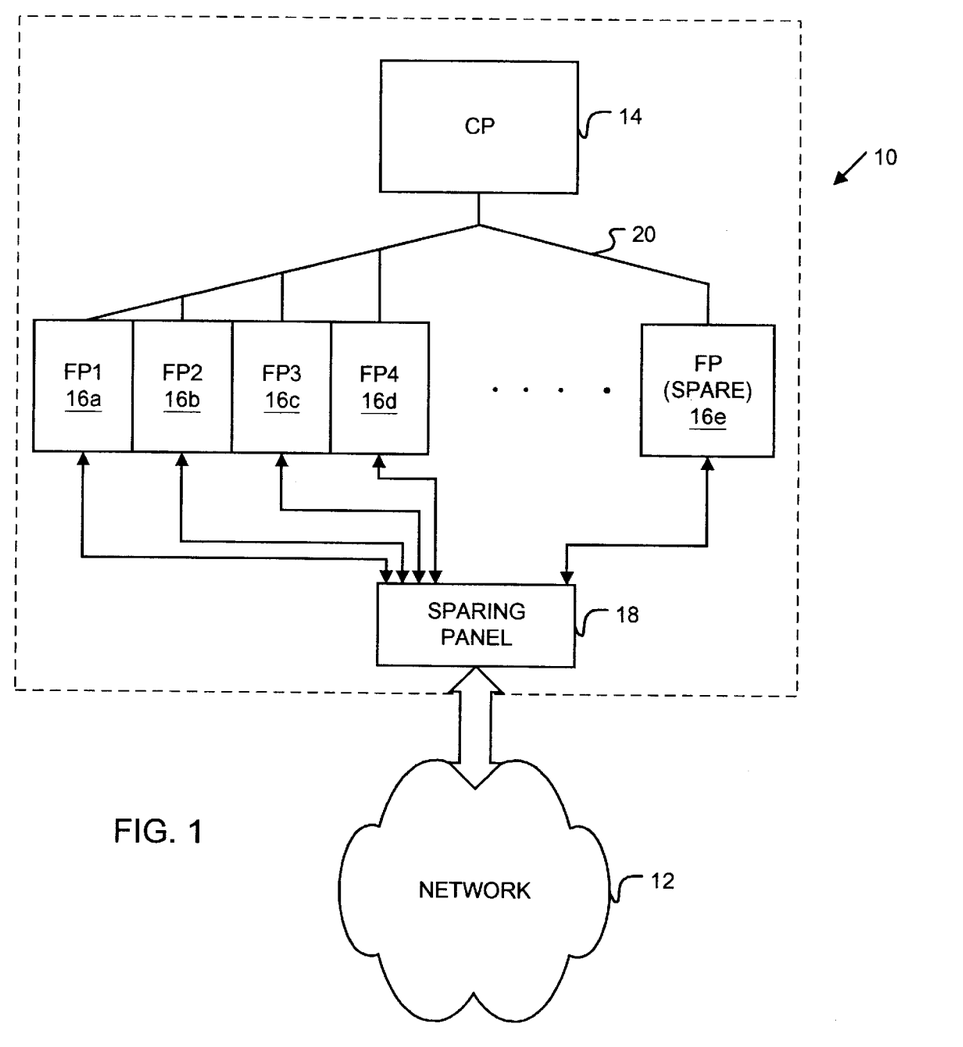
FIG. 1 is a block diagram of a modular communications system, exemplary of a preferred embodiment of the present invention.

FIG. 1 illustrates a modular communications system 10, exemplary of a preferred embodiment of the present invention. System 10 is preferably a data communications switch such as an asynchronous transfer mode ("ATM") switch, internet protocol switch, router, or the like interconnected with communications network 12. System 10 preferably comprises a control processor module ("CP") 14 interconnected with a plurality of functional processor modules ("FP"s) 16a to 16e, by control links 20. For simplicity, only five FPs 16a to 16e are illustrated.

As an example, system 10 could be a modified Nortel Passport product as detailed in the Nortel Publication entitled "Passport General Description", No. NTP-241-7001-110, and "Passport Operations and Maintenance Guide", No. NTP-241-7001-150 the contents of both of which are hereby incorporated herein by reference, available from Nortel, Ottawa, ON, Canada, modified in accordance with the present invention.

FPs 16a to 16e are interconnected with sparing panel 18. Sparing panel 18 in turn, acts as a network interface and is interconnected with network 12. As illustrated, network 12 may be a conventional internet protocol network or any other suitable network such as an ATM, frame relay, wireless, or optical network or the like. Network 12, could also comprise a plurality of smaller networks, bridged by system 10. FPs 16a to 16e typically receive, switch, process route and pass payload data from and to network 12. An administrator console (not shown) may be interconnected with system 10, allowing an administrator to monitor and adjust the operation of system 10.

Physically, CP 14, FPs 16a to 16e, and sparing panel 18 are preferably housed in a single communications shelf or rack (not shown), with each of CP 14 and FPs 16a to 16e occupying one slot within the rack. CP 14 and FPs 16a to 16e are in communication with each other by way of a bus extending from a back plane of the rack interconnecting the FPs 16a to 16e and CP 14 Of course many other physical arrangements are possible.

Each FP 16a to 16e comprises a processor, persistent memory, and interface hardware. Persistent memory of each FP typically comprises a small read-only memory portion, containing software enabling each FP to load additional software from an interconnected CP, as detailed below. Each FP 16a to 16e typically receives payload data from network 12 through panel 18. Software within persistent memory adapts FPs 16a to 16e to process payload data. FP 16a to 16e may, for example, forward packets, or convert between known protocols. As will become apparent, each FP 16a to 16e may operate in active or standby states. Additionally, each FP 16a to 16e may be disabled or "shutout".

CP 14 also comprises a processor and persistent storage memory. CP 14 under software control of programs loaded within its memory directs the overall operation of system 10, and specifically directs the operation of FPs 16a–16e and additionally controls the operation of sparing panel 18 via data link 20, in a manner exemplary of the present invention. CP 14 may also track faults for statistical purposes. Memory of CP 14 preferably maintains a convention multi-tasking operating system, and operational software. CP 14 also preferably maintains operational software that is loaded by FPs 16a to 16e, as detailed below. Further, CP 14 maintains state information about the state of each FP 16a to 16e.

In the exemplary illustrated embodiment, FP1 to FP4 (16a to 16d) are "primary" FPs that act to process traffic at system 10. System 10 is designed to handle traffic at all primary FPs simultaneously. FP 16e, on the other hand, is a "spare" FP, intended typically to be used only when one of "primary" FP1 to FP4 (16a to 16d) fail. Physically, FPs 16a to 16e are preferably interchangeable. However, FP 16e occupies a slot designated as slot for a spare FP. While, in the illustrated embodiment, the role of FP 16e as a spare FP is slot dependent, it will be appreciated that FP 16e or any other FP could easily be logically designated as a spare. Software within CP 14 could track the physical slot location of a spare FP.

Figure 2:
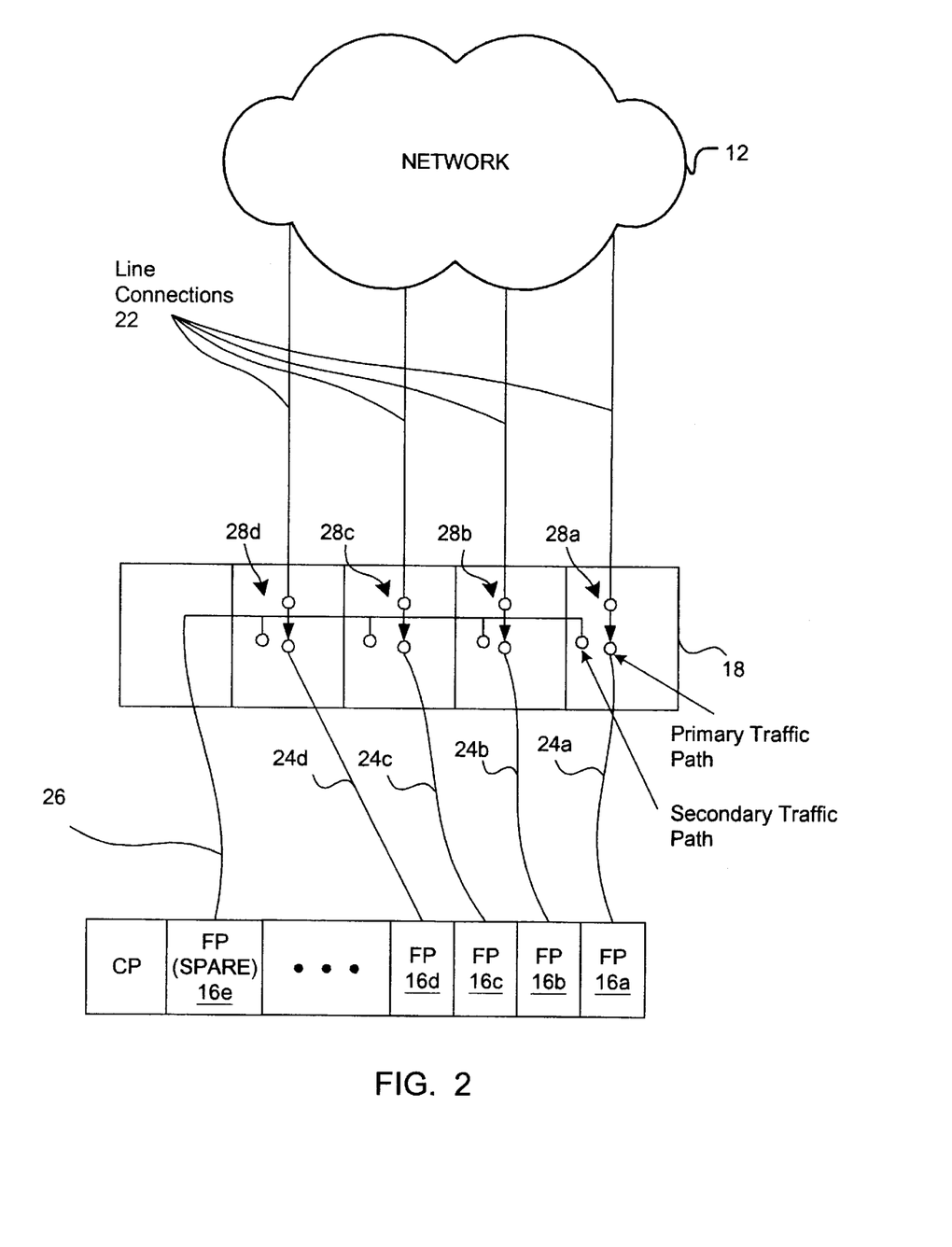
FIG. 2 is a block diagram of a portion of the modular communications system of FIG. 1.

FIG. 2 illustrates the configuration of sparing panel 18, interconnected with FPs 16a to 16e and network 12. Sparing panel 18 acts as a distributor for payload data between system 10 and network 12. Sparing panel 18 comprises a plurality of relays 28a–28d (only four are illustrated) that route traffic from incoming lines 22 interconnected with network 12 or to a primary traffic paths 24a to 24d or a secondary traffic path 26. The primary traffic paths 24a to 24d connect the incoming lines 22 to one of the primary FP1 to FP4 (16a to 16d). Secondary traffic path 26, may connect an incoming traffic line to a spare FP 16e. That is, line connections 22 arrive at panel 20. Line connections 22 may, for example, be ethernet connections, DS1, DS3 or synchronous optical network ("SONET") terminations, terminating from network 12. Panel 18 is preferably controlled by CP 14 and redirects traffic between network 12 and particular FPs of system 10 depending on whether FPs are active or inactive, as detailed below.

As will be appreciated sparing panel 18 of the illustrated embodiment is a basic sparing panel. A more elaborate sparing panel, suitable for use as part of system 10, may receive all incoming traffic at a single concentrating point and distribute that traffic to any of FPs 16a to 16e, allowing for the flexible configuration of spare and active FPs, with "spare" FPs designated as such logically, rather than physically. Sparing panel 18, could for example, be replaced by a sparing module capable of performing equivalent functions, and housed in a slot of the rack housing, the remainder of system 10.

In operation, primary FP1 to FP4 (16a to 16d) are operating in 1:n ("1 for n") redundancy. That is, FP1 to FP4 (16a to 16d) are exchanging payload data with network 12, while spare FP 16e is operating in redundancy for all primary FPs, FP1 to FP4 (16a to 16d). Upon failure of one of primary FP1 to FP4 (16a to 16d), CP 14 is alerted of a failure by periodically probing the FP1 to FP4 (16a to 16d); by a hardware interrupt; or by another message known to those skilled in the art. In response CP 14 under software control redirects traffic at the failed primary FP as detailed below.

As noted, in traditional fault tolerant, redundant systems, failure of an active device or module typically causes immediate switch-over of data to a redundant module. This, however, ignores the possibility that failure of an active module may only be temporary, as for example, the result of a software failure that may be aberrant.

Accordingly, system 10 utilizes at least one and preferably three timers illustratively designated as T1, T2, and T3 for each FP 16a to 16e in order to effect sparing of primary FP1 to FP4 to spare FP 16e as best illustrated in FIGS. 3 to 11. Timers T1, T2 and T3 may be implemented in software at CP 14 using conventional techniques. Preferably timers T1, T2 and T3 are count-down timers.

Specifically, in the preferred embodiment, a first "sparing" timer, T1, is used within CP 14 to test that FP failure is persistent for the duration of the timer, allowing a temporarily failed FP to recover. A second "load" timer, T2 is used to ensure successful software loads after a reset of a failed module. Lastly, a third "stability" timer, T3, is used within CP 14 to ensure that temporary failures for recovered FPs do not repeat themselves during a specified interval.

The durations of sparing timer T1, software load timer T2 and stability timer T3 are preferably software configurable and will depend on the speed of system 10, as well as a tolerable repeat failure interval. In the example system 10 an interval of three minutes is chosen for sparing timer T1; an interval of five minutes is chosen for software load timer T2, while an interval of one hour is chosen for stability timer T3. As will be appreciated, the intervals for sparing timer T1; software load timer T2; and stability timer T3 could be adjusted individually for each primary FP1 to FP4 (16a to 16d). Moreover, these timers could be configurable through administrator console (not shown) interconnected with system 10.

Figure 3:
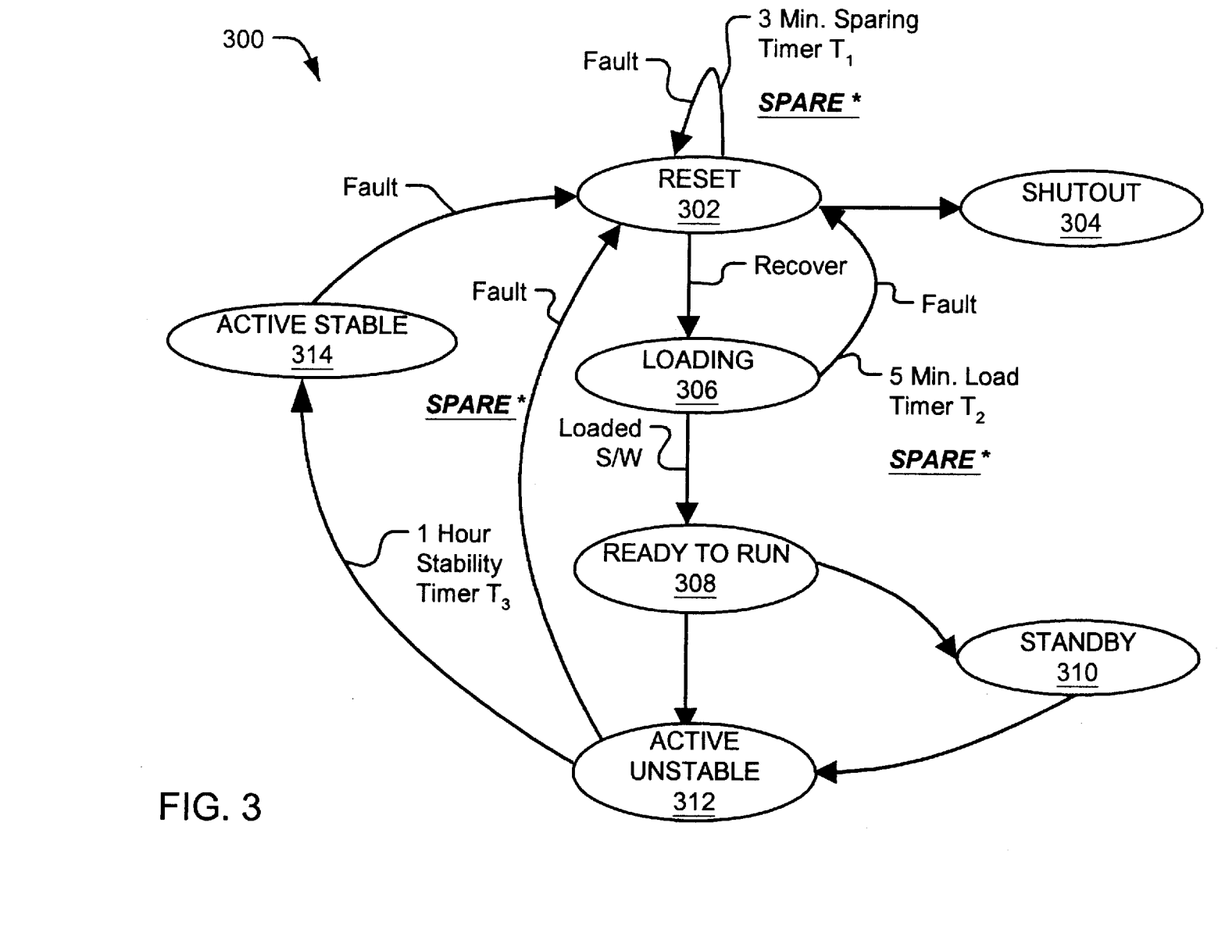
FIG. 3 is illustrates a state machine, exemplary of operation of a preferred embodiment of the present invention.

CP 14, under software control, maintains and updates, within its memory indicators of the state of each of FP 16a to 16e. FIG. 3 illustrates an exemplary "state machine" 300 representing the various states of any one of FPs 16a to 16e and transition between the states. In the exemplary embodiment, separate state machines are maintained for each FP 16a to 16e are by CP 14, under software control. As appreciated by those skilled in the art, each state changing event causing CP 14 to effect a transition of any affected FP, as illustrated.

It should be noted, that in the exemplary embodiment CP 14 maintains and reacts to state changes of all FPs at the same time, by maintaining separate state machines. The state machine may, for example, be implemented as simultaneously executing programs running under software control of a real-time multitasking operating system at CP 14, as understood by those skilled in the art.

So, upon initialization of system 10, an exemplary FP1 16a is reset and assumes its RESET state 302. If reset is successful, FP1 16a assumes LOAD state 306 and loads required software from CP 14 into its memory using a small load routine stored within a read-only portion in its memory. Assuming the software load is successful, FP1 16a assumes a READY state 308. In this READY state 308, CP 14 determines whether FP 16a is to assume the role of a spare FP.

If so, FP 14 assumes STANDBY state 310. In STANDBY state 310, the software responsible for the illustrated state machine for FP1 16a at CP 14 may constantly poll other FPs 16b to 16e whether any of these need to be "spared". In the preferred embodiment, however, at CP 14 is notified of a failure of FPs 16b to 16e, by way of software interrupt, as detailed below.

In the preferred embodiment, CP 14 will only use a primary FP such as FP1, 16a to replace spare FP 16e if spare FP 16e fails while handling traffic otherwise handled by FP1 16a, In contrast, CP 14 will use FP 16e to spare any failed primary FP1 to FP4. Of course, a person skilled in the art will appreciate that system 10 could easily be adapted so that any FP could be used to spare any other FP in response to failure of the other FP.

If FP1 16a is to assume the role of an active FP, it assumes its first active state, ACTIVE UNSTABLE state 312. At this transition from STANDBY state 310 to ACTIVE UNSTABLE state 312, stability timer T3 is initialized at CP 14. Once the stability timer T3 expires, FP1 16a assumes ACTIVE STABLE state 314.

Now, once FP1 16a is in its ACTIVE STABLE state 314, a failure at FP1 16a, sensed at CP 14 FP1 to reset itself in response to sensing the failure. Additionally, CP 14 may periodically poll FP1 16a (and other FPs) and reset any that may have failed without resetting themselves. Upon reset, FP1 16a and to assume RESET state 302. Upon FP1 16a assuming its RESET state 302, CP 14 also initiates a sparing timer T1 for FP1 16a.

If FP1 16a fails again, before the expiry of T1, and while in RESET state 302, it again resets itself and provides CP 14 with an indication of the fault. CP14 generates a signal, preferably a software interrupt, perceptible by software processes controlling state machines for other FPs (and indicated by the SPARE* signal in FIG. 3) indicating that FP1 should be spared. FP1 16a again reset and FP1 16a is replaced by a spare FP. If FP1 16a fails repetitively within durations less than T1, and after being spared, CP 14 causes it to assume SHUTOUT state 304, preventing it from assuming an active or standby state until intervention by an operator.

If the reset of FP1 16a is successful, FP1 16a assumes LOAD state 306, during which software is again transferred from CP 14 to memory of FP1 16a. At the same time load timer T2 is initiated. Upon successful completion of a software load, FP1 16a assumes its READY state 308. If FP1 16a does not vacate LOAD state 306 before the expiry of load timer T2, FP1 16a is returned to its RESET state 302, and spared as detailed below.

In READY state 308, CP 14 decides whether or not the reset FP1 16a assume its STANDBY state 310, or whether it should assume its ACTIVE UNSTABLE state 312. If the reset FP1 16a has already been spared, and traffic for that FP1 is being processed by the spare FP 16e, FP1 16a assumes STANDBY state 310. Otherwise, FP1 16a assumes its ACTIVE UNSTABLE state 310. Thus, single failures of FP1 16a that persist for durations less than T1 do not cause CP 14 to spare FP1 16a.

Upon assuming its ACTIVE UNSTABLE state 312, CP 14 initiates stability timer T3. If FP1 16a fails prior to the expiry of timer T3, FP1 16a is spared and again placed in its RESET state 302. FP1 16a is returned to its ACTIVE STABLE state 314, only upon expiry of stability timer T3.

Any time primary FP1 16a must be spared, a state machine, substantially similar to state machine 300 for FP 16a, and also executing at CP 14 and controlling operation of spare FP 16e will cause spare FP 16e, if it is in its STANDBY state 310, to assume its ACTIVE UNSTABLE state 312 upon sensing a software interrupt at CP 14 caused as a result of a requirement that another FP be spared. Between transitions from its STANDBY state 310 to its ACTIVE UNSTABLE state 312, CP 14 initializes spare FP 16e by providing operating parameters corresponding to the failed primary FP1 16a including services and configuration data, also maintained at CP 14, and switching traffic at the failed FP1 16a to spare FP 16e.

CP 14 switches traffic from a primary FP1 16a to a spare FP 16e by switching the relay within sparing panel 18 associated with the failed primary FP 16a, from the primary traffic path 24a to the secondary (spare) traffic path 26. This redirect network traffic at the failed primary FP1 16a to the spare FP 16e.

If a spare FP 16e, in its STANDBY state 310, is not available (either because a spare FP does not exist, or because it is already acting as a spare for another failed FP), active FP1 16a is simply not replaced by a spare FP 16e. Traffic handled by the failed primary FP is simply lost. If the reset primary FP 16a becomes active again it may handle future traffic at that primary FP 16a.

In the preferred embodiment, if multiple FPs have concurrently failed, an FP in its STANDBY state 310 will spare the first logical failed FP. FP1 has the lowest logical designation, while FP4 has the highest. Concurrent failure of multiple FPs may, for example, occur at initialization of system 10. Thus, in the preferred embodiment, if, for example, FPs 16a and 16b have failed, FP 16e will spare logically lower FP1 16a.

The above states, and the methods effected by these states may be better appreciated with reference to the exemplary timing diagrams in FIGS. 4–11 illustrating an exemplary system of FIG. 1, in operation. In the timing diagrams, t1, t2, t3, t4, t5, t6, t7 and t8 are not intended to illustrate the same times in each diagram, but instead are only intended to illustrate relative times, with $t1<t2<t3<t4<t5<t6<t7<t8$. As well, for simplicity, the effect of load timer T3 has not been illustrated. ACTIVE STABLE and ACTIVE UNSTABLE states are indicated in FIGS. 4–11 with abbreviations "A.S." and "A.U.".

Figure 4:
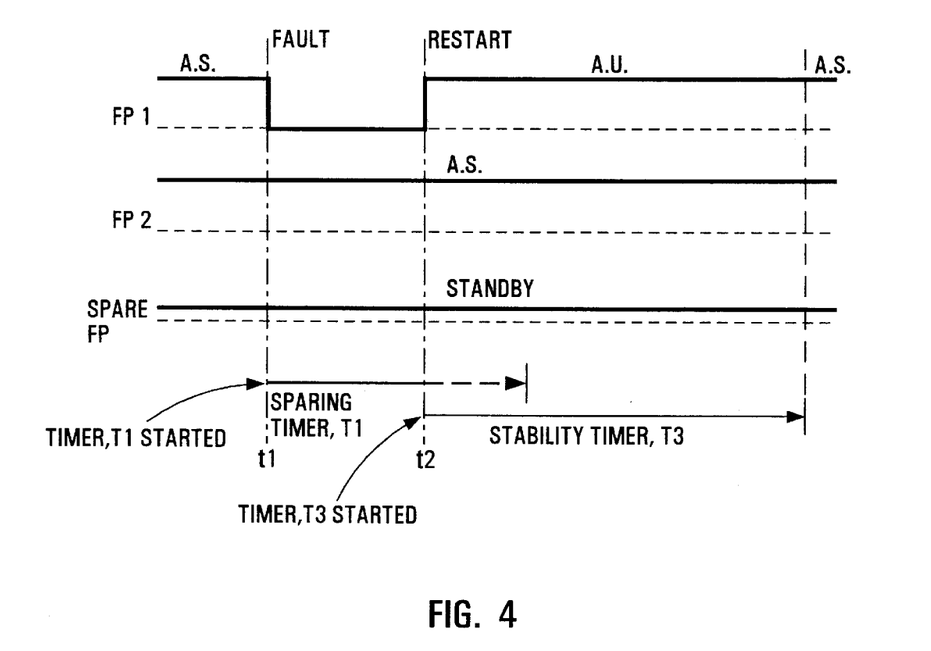
FIGS. 4–11 are timing diagrams, illustrating the operation of the system of FIGS. 1 and 2.

Specifically, as illustrated in the example timing diagram of FIG. 4, an FP1 16a (FIG. 1) operating in ACTIVE STABLE state 314 may fail at t1, while another active FP2 16b remains operational in its ACTIVE STABLE state 314 (FIG. 3). A spare FP 16e operates in its STANDBY state 310 throughout. Software within CP 14 detects the failure, by way of, for example, a hardware interrupt causing a transition from state. Software within CP 14 initiates a sparing timer T1, also at t1 for FP1 16a. At the same time, CP 14 issues a command to FP1 to reset and therefore assume RESET state 302. If the reset is successful before expiry of T1 (ie. before t2), FP1 16a assumes LOAD state 306 and thereafter READY state 308 and ACTIVE UNSTABLE state 312. Thus, CP 14 does not switch-over traffic from FP1 16a to spare FP 16e.

Figure 5:
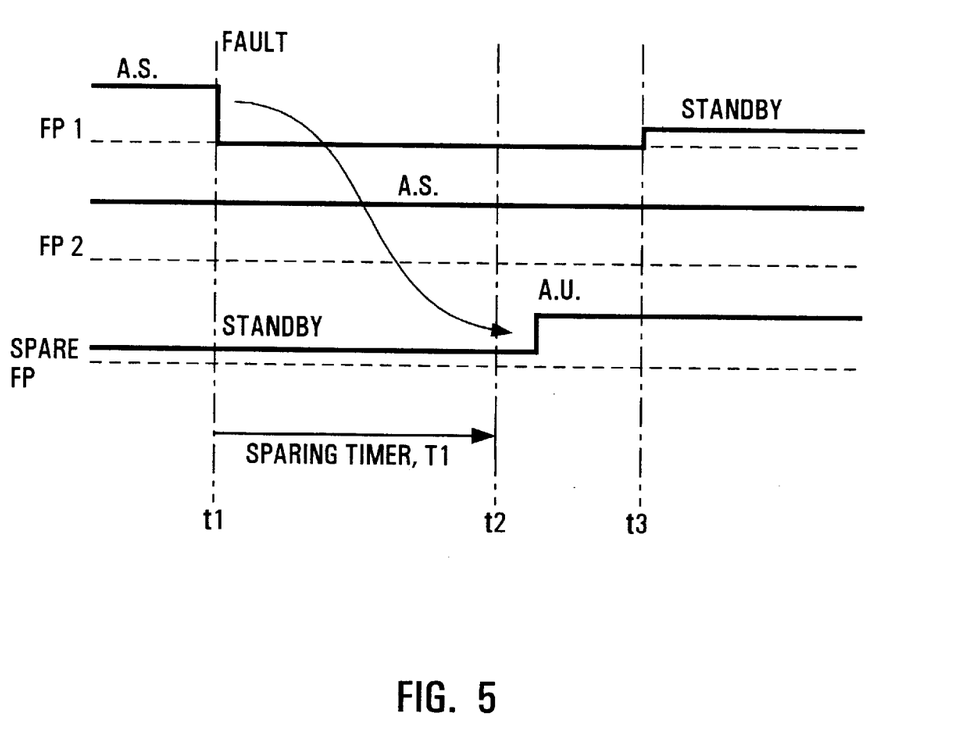

In the example timing diagram of FIG. 5, a failure of FP1 16a in its ACTIVE STABLE state 314 at t1, persists for a time period exceeding the duration of sparing timer T1, until at least t2. Reset of FP1 in this interval is unsuccessful. A spare FP 16e is available. Accordingly at 2t, spare FP 16e is initialized and traffic is switched from FP1 16a to the spare FP 16e, shortly after T1 expires. Spare FP 16e, in its ACTIVE UNSTABLE state 312, then assumes the role of FP1 16a. If FP1 recovers after expiry of T1 at t3, it assumes its STANDBY state 310.

Figure 6:
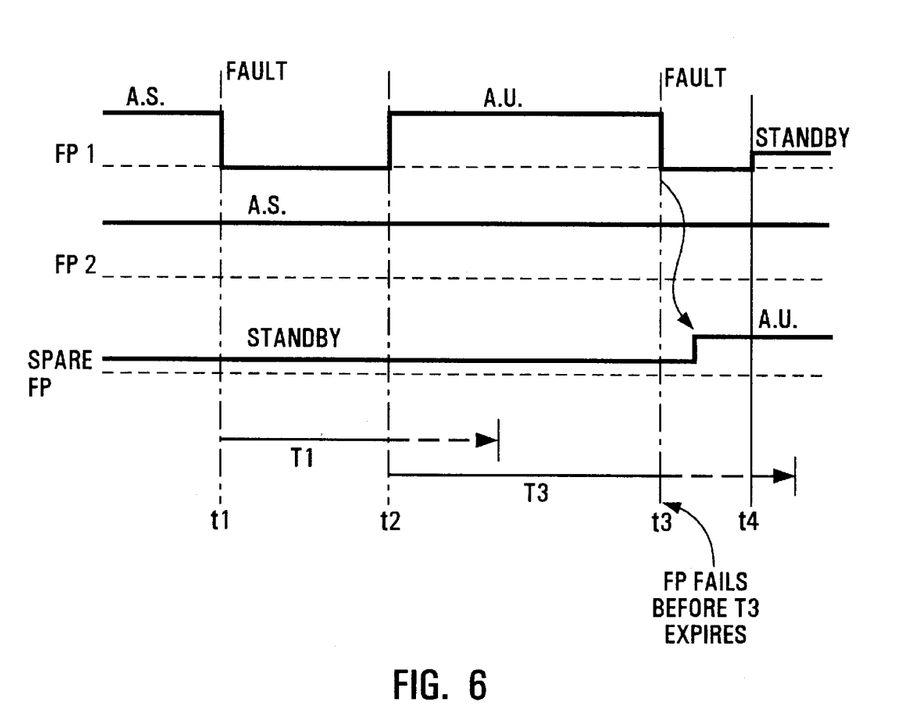

As illustrated in the further example diagram of FIG. 6, FP1 16a may also be spared by FP 16e, in the event of multiple repetitive failure of primary FP1 16a. That is, as illustrated, in the event primary FP1 16a initially fails at t1, but assumes its ACTIVE UNSTABLE state 312 at t2 before the expiry of sparing timer T1, traffic is not switched from active primary FP1 16a. If after assuming its ACTIVE UNSTABLE state 312, FP1 16a, fails again before the expiry of stability timer T3, at t3, FP1 16a is spared. Traffic is immediately switched from FP1 16a to spare FP 16e, which assumes its ACTIVE UNSTABLE state 312. FP1 16a assumes its STANDBY state 308 at t4. FP1 16a will remain in its STANDBY state 310, until another FP fails.

Figure 7:
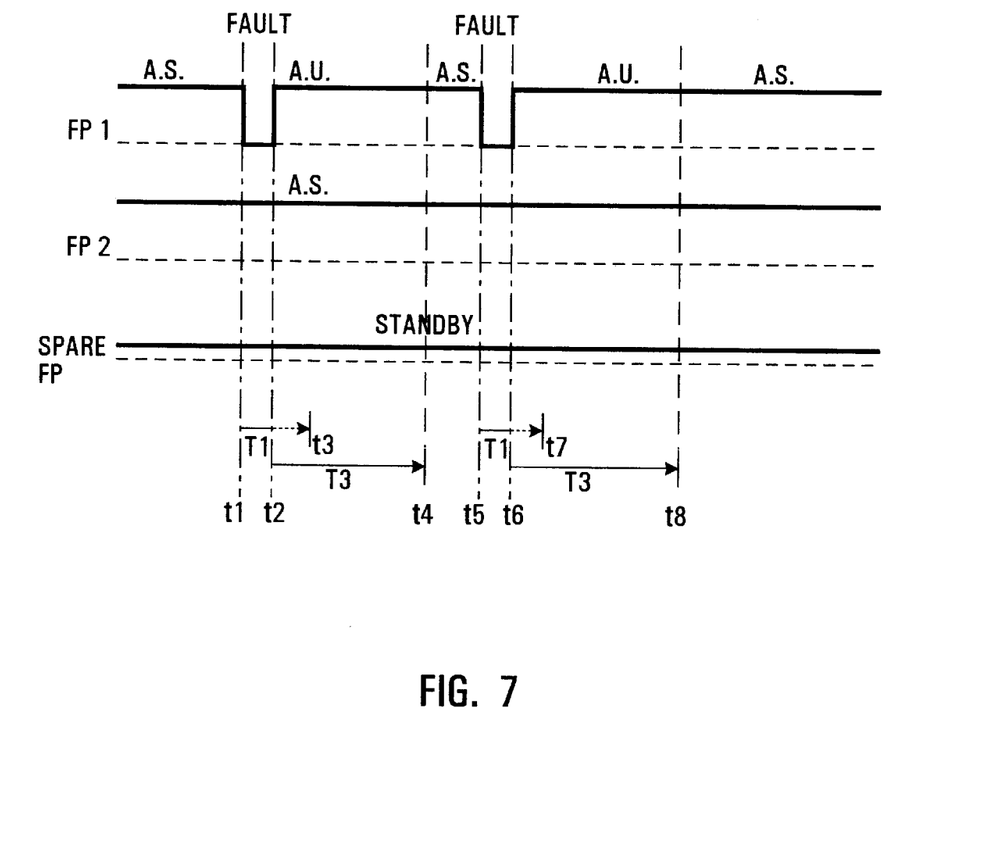

If, on the other hand, as illustrated in FIG. 7, failures of FP1 are repetitive at t1 and t5, intervals greater than stability timer T3, the repetitive failures do not cause FP1 16a to be spared to FP 16e. Of course, the failures of FP1 16a may be tracked by software within CP 14, so that persistent repetitive failures may be monitored by an administrator.

Figure 8:
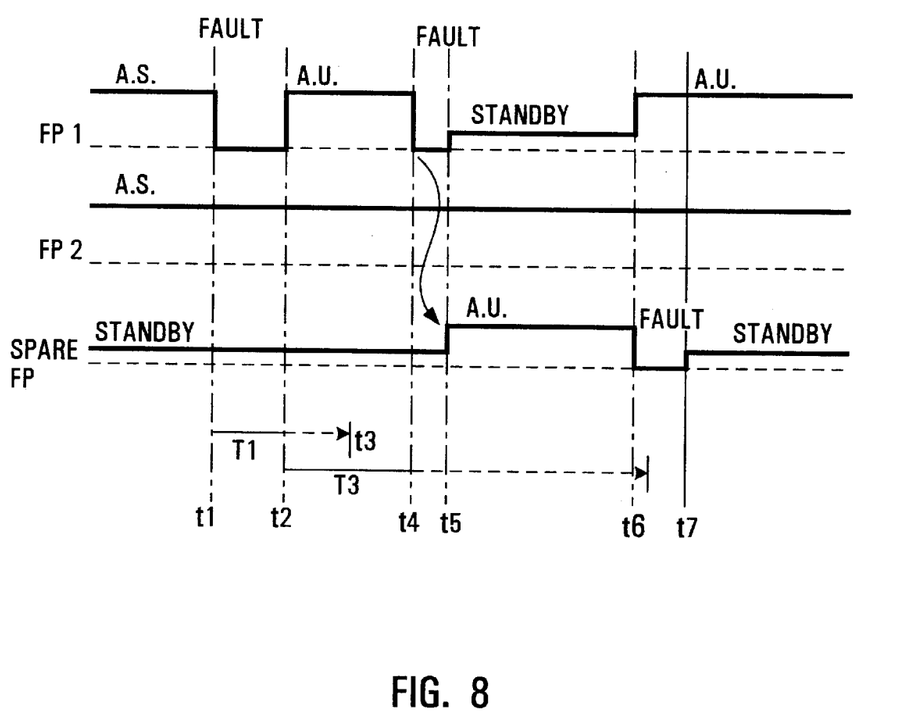

As noted, once spare FP 16e has assumed the role of primary FP1 16a, FP1 16a assumes its STANDBY state, if it is successfully reset. This is illustrated in FIG. 8. As illustrated, spare FP 16e assumes one of its active states and switches data after the second failure of active primary FP1 16a shortly after t4. After a successful reset, FP1 16a assumes its STANDBY state 310 at t5. At t6, spare FP 16e fails. At this time, primary FP1 16a switches from its STANDBY state 310 to its ACTIVE UNSTABLE state 312 at t6 and spares the failed spare FP 16e. If the spare FP 16e recovers it is placed in its STANDBY state, as illustrated at t7.

Figure 9:
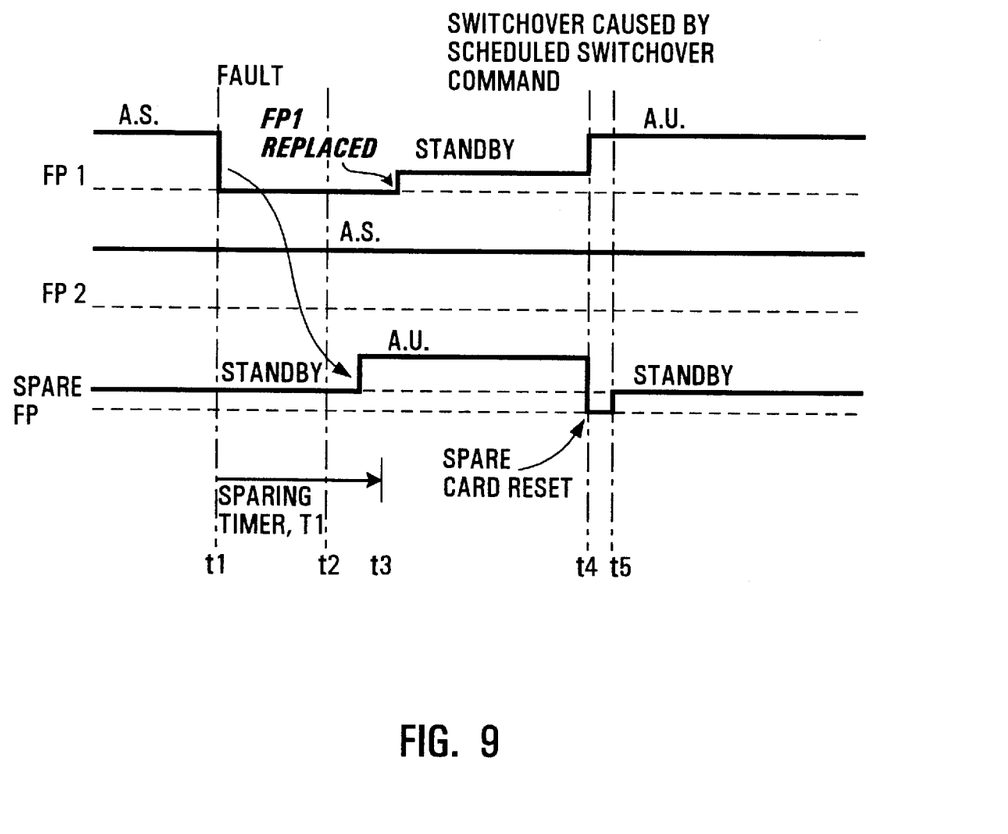

As will be appreciated, upon failure of a primary FP, CP 14 prompts replacement of the failed FP by an operator, notified at the interconnected administrator console, or otherwise over network 12. After replacing a failed FP, an operator may schedule a precise time to switch-over traffic to the replaced FP. An operator may schedule the switchover of traffic to the replaced FP, by entering instructions at the interconnected console or over network 12. As illustrated in FIG. 9, primary FP1 16a fails at t1, after expiry of sparing timer T1, at t2, traffic formerly processed at FP1 is switched to spare FP 16e. At t3, FP1 16a is physically replaced and assumes its STANDBY state 310. A switchover, however, is only scheduled for t4, at which time spare FP 16e is reset by CP 14. This causes FP1 16a to change state from STANDBY state 310 to ACTIVE UNSTABLE state 312. Spare FP 16e assumes its STANDBY state at t5, shortly thereafter.

Figure 10:
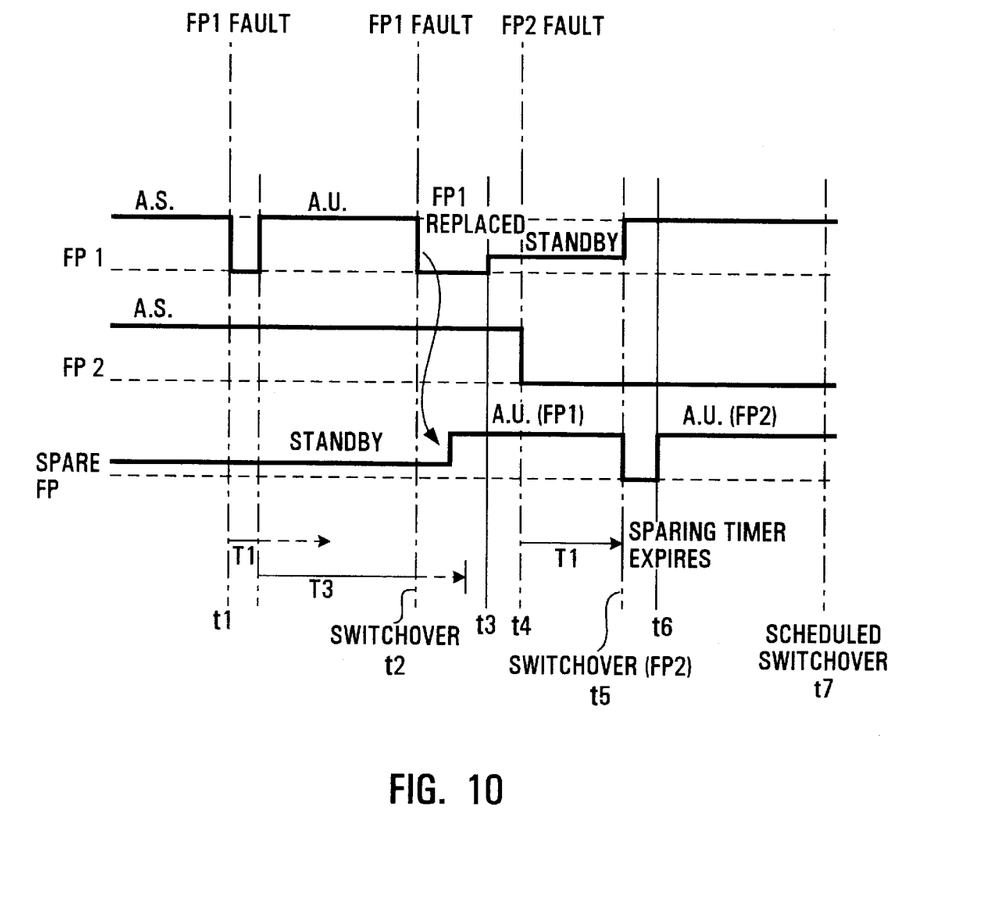

A scheduled switch-over in the event of multiple failures is illustrated in FIG. 10. Specifically, primary FP1 16a fails at t1 and t2, so as to cause traffic to be switched to spare FP 16e (as described above with reference to FIG. 6). Shortly before t3, FP1 is physically replaced, and therefore assumes it STANDBY state 310 shortly thereafter. A switchover is only scheduled for t7. At t4, FP2 fails. In the preferred embodiment, FP1 will not spare FP2 as FP1 is a primary FP. Its state machine 300 will only cause FP1 to spare FP 16e in the event spare FP 16e is handling traffic originally designated for FP1. However, CP 14 will expedite the switch-over of traffic as follows. Assuming, for example, a future switch-over is scheduled to occur at t7 by an administrator, inputting switch-over commands between t3 and t5. Absent failure of two FPs 16a to 16e, switch-over would be delayed until t7. However, in the presence of a second failure of FP2, spare FP 16e is reset immediately upon sensing failure of FP1. Thus, at t5 replaced FP1 assumes its ACTIVE UNSTABLE state 310. Now, as FP2 is inactive, shortly after switch-over at t5, FP2 16b is spared by spare FP 16e which begins to carry the traffic at FP2 at t6. Of course, the switch-over at t7 is no longer processed.

Figure 11:
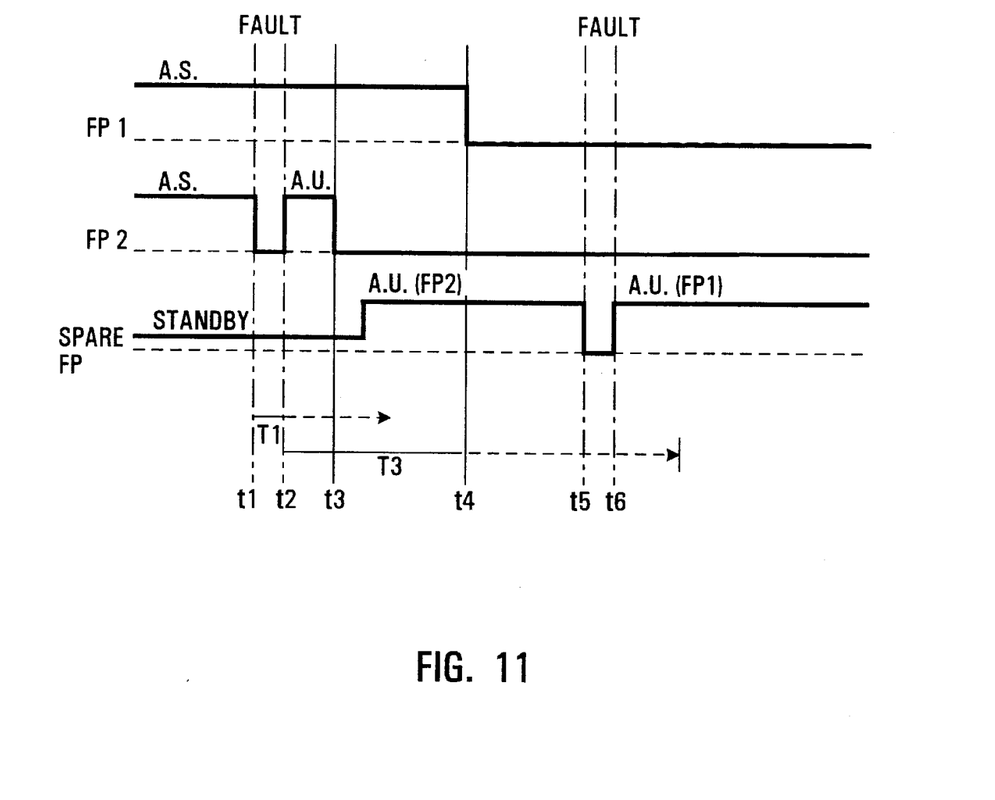

A failure of a spare FP 16e in the presence of a failure of the primary FPs 16a and 16b is illustrated in FIG. 11. Specifically, at t3, FP2 fails so as to cause spare FP 16e to assume its ACTIVE UNSTABLE state and handle traffic, previously handled by primary FP2 16b, shortly thereafter. At t4, FP1 fails. As spare FP 16e is already handling traffic of FP2, FP1 cannot be spared. At t5, spare FP 16e fails and recovers from its failure at t6 and assumes its ACTIVE UNSTABLE state 312. As a result, however, spare FP 16e carries traffic from primary FP1 16a rather than from FP2 16b. That is, as noted above, spare FP 16e begins to handle traffic for primary FP1 16a, the lowest logical active FP for which the spare FP acts as a spare.

While the above example embodiments have been described with reference to a communications system offering 1:n redundancy, a person skilled in the art will appreciate that the present invention may easily be utilized as part of other computing system. Moreover, the invention could be used in systems offering m:n redundancy. Similarly, while the above embodiments employ multiple state machines to control FPs 16a to 16e, a person skilled in the art will appreciate that many other similar software solutions to effect a similar system, also exemplary of the present invention.

Finally, it will be understood that the invention is not limited to the embodiments described herein. These are merely illustrative of preferred embodiments of carrying out the invention, and are susceptible to numerous modification of form, arrangement of components, and details and order of operation. The invention, rather, is intended to encompass all such modification within its spirit and scope, as defined by the claims.

What is claimed, is:

1. In a data communications switch comprising at least one primary module for processing data under software control, and one spare module capable of processing data under software control, a method of handling recoverable faults, comprising the steps of:

a. sensing failure of said primary module;

b. resetting said primary module in response to sensing said failure;

c. waiting a sparing interval for successful reset of said primary module;

d. if reset in step b. is not successful in said sparing interval, switching said data from said primary module to said spare module, and processing said data at said spare module;

e. if said sparing interval expires, said primary module assumes a load state during which software is loaded and a load interval is initiated;

f. if said primary module is successfully software loaded before the expiry of said load interval, said primary module assumes an active unstable state and a stability interval is initiated; and     g. if said primary module remains stable for the duration of said stability interval, said primary module assumes an active stable state.

2. The method of claim 1, further comprising the step of:

h. if said primary module fails repetitively within said sparing interval and after switching said data from said primary module to said spare module, said primary module is shut out.

3. The method of claim 1, further comprising the step of:

i. switching said data from said primary module to said spare module if said primary module previously failed during said stability interval.

4. The method of claim 3, wherein said data communications switch is taken from the group consisting of asynchronous transfer mode switches, internet protocol switches and routers.

5. The method of claim 3, further comprising the step of:

j. resetting of said stability timer after said defined stability interval.

6. The method of claim 5, further comprising the step of:

k. if said primary module is successfully software loaded before the expiry of said load interval, said primary module assumes a standby state if said primary module has already been spared.

7. The method of claim 6, further comprising the step of:

l. if said primary module is in said standby state, transitioning said primary module to an active unstable state, if said spare module fails.

8. The method of claim 1, wherein step d. further comprises the step of initializing said spare module using operating parameters corresponding to said failed primary module.

9. A data communication switch comprising:

a. at least one primary processing module, operable to process data at said primary processing module;

b. a spare processing module, capable of processing data at said spare module;

c. a control processor interconnected with said spare processing module and said primary processing module to switch data between said primary module and said spare module;

said control processor operable to:

i. sense failure of said primary module;

ii. reset said primary module in response to sensing said failure;

iii. wait a sparing interval for successful reset of said primary module;

iv. switch said data from said primary module to said spare module, and process said data at said spare module, if reset in step (ii) is not successful in said sparing interval;

v. cause said primary module to assume a load state during which software is loaded and to initiate a load interval, if said sparing interval expires;

vi. cause said primary module to assume an active unstable state and to initiate a stability interval if said primary module is successfully software loaded before the expiry of said load interval; and vii. cause said primary module to assume an active stable state, if said primary module remains stable for the duration of said stability interval.

10. The switch of claim 9, further comprising a network interface in communication with said control processor, interconnecting said primary and spare modules to a data network to process data from said data network.

11. The switch of claim 10, wherein said control processor redirects traffic at said network interface to switch data from said primary processing module to said spare processing module.

12. The switch of claim 10, wherein said data network is one of an internet, a frame relay network, and an asynchronous transfer mode network.

13. The switch of claim 10 wherein said network interface comprises a plurality of relays that route said data arriving on a plurality of incoming lines from said data network to traffic paths connecting said network interface to said primary and spare modules.

14. The switch of claim 13 wherein said incoming lines are taken from the group consisting of Ethernet connections, DS1, DS3 and SONET terminations.

15. In a data communications switch comprising a control processor interconnected with a spare processing module and at least one primary processing module, a computer readable medium having stored thereon, computer-executable instructions, which when acted upon by the control processor, cause the control processor to:

i. sense failure of said primary module;

ii. reset said primary module in response to sensing said failure;

iii. wait a sparing interval for successful reset of said primary module;

iv. switch said data from said primary module to said spare module, and process said data at said spare module, if reset in step (ii) is not successful in said sparing interval;

v. cause said primary module to assume a load state during which software is loaded and to initiate a load interval, if said sparing interval expires;

vi. cause said primary module to assume an active unstable state and to initiate a stability interval if said primary module is successfully software loaded before the expiry of said load interval; and vii. cause said primary module to assume an active stable state, if said primary module remains stable for the duration of said stability interval.

* * * * *